(12) United States Patent
Chesnut

(10) Patent No.: US 6,609,766 B1
(45) Date of Patent: Aug. 26, 2003

(54) UNIFIED BRAKE SYSTEM FOR TOWED AND TOWING VEHICLES

(76) Inventor: Ronald Chesnut, 15327 Valeda Dr., La Mirada, CA (US) 90638

( * ) Notice: Subject to any disclaimer, the term of this patent is extended or adjusted under 35 U.S.C. 154(b) by 0 days.

(21) Appl. No.: 09/641,631

(22) Filed: Aug. 18, 2000

Related U.S. Application Data

(63) Continuation-in-part of application No. 09/099,217, filed on Jun. 18, 1998, now abandoned.

(51) Int. Cl.[7] ............................................... B60T 13/00
(52) U.S. Cl. ........................ 303/7; 303/15; 188/112 R; 188/3 R
(58) Field of Search ................. 303/7, 15, 12, 303/3, 20; 188/112 R, 345, 3 R

(56) References Cited

U.S. PATENT DOCUMENTS

| | | | | |
|---|---|---|---|---|
| 2,705,870 A | * | 4/1955 | Holton | 303/12 |
| 3,915,506 A | * | 10/1975 | Farron et al. | 303/7 |
| 4,072,362 A | * | 2/1978 | Van Anrooy | 303/7 |
| 4,099,790 A | * | 7/1978 | Hipps | 303/7 |
| 4,398,771 A | * | 8/1983 | McCurry et al. | 303/15 |
| 5,431,253 A | * | 7/1995 | Hargrove | 188/112 R |
| 5,503,468 A | * | 4/1996 | Saffran | 303/7 |
| 5,626,402 A | * | 5/1997 | Saffran | 303/7 |
| 5,823,637 A | * | 10/1998 | Blue | 303/7 |
| 6,280,004 B1 | * | 8/2001 | Greaves, Jr. | 303/20 |

* cited by examiner

*Primary Examiner*—Matthew C. Graham
*Assistant Examiner*—Mariano Sy
(74) *Attorney, Agent, or Firm*—Michael L. Greenberg; Greenberg & Lieberman

(57) ABSTRACT

The present invention provides a new braking system for a first vehicle towing a second vehicle on its own four wheels. The system exhibits a process by which the towing vehicle's brake system send an electronic relay to the towed vehicle's brake system making the brake depress at the proper rate of deceleration.

12 Claims, 5 Drawing Sheets

UNIFIED BRAKE SYSTEM FOR TOWED
AND TOWING VEHICLES

REFERENCE TO EARLIER APPLICATION

This Application is a CIP Application of U.S. patent application Ser. No. 09/099,217, filed Jun. 18, 1998, now abandoned by Ronald Chesnut entitled UNIFIED BRAKE SYSTEM FOR TOWED AND TOWING VEHICLES from which it claims priority.

BACKGROUND OF THE INVENTION

1. Field of the Invention

The present invention relates to controlled braking of vehicles. More particularly, the present invention provides a system for operating the brakes of a towed second vehicle in response to the braking of a first vehicle.

2. Description of the Prior Art

When operating larger road vehicles, such as recreational vehicles (RVs), motor homes, trucks, and the like, it is often desirous to also have a smaller vehicle available. Typically, this is accomplished by either having two drivers operating the vehicles independently, or by trailering the smaller vehicle to the larger vehicle. Operating two vehicles independently has several disadvantages, including increased fuel consumption and driving labor, as well as the possibility of the vehicles being separated in the course of travel. Trailering requires yet a third vehicle upon which the smaller vehicle is carried, adding expense as well as requiring storage/parking accommodations.

A third option is to tow the smaller vehicle on its own four wheels. Heretofore, this has been typically accomplished by hitching the smaller vehicle to the larger vehicle and placing the smaller vehicle in a neutral gear. While this may seem a reasonable solution, it poses some serious problems. Among the most serious, is the complete reliance on the towing vehicle for braking the greatly increased mass of the towing vehicle/towed vehicle combination. This increased mass disadvantageously impacts both the stopping distances and time, as well as creating undue wear on the brakes of the larger vehicle. Further, the mechanical connection between the larger vehicle and the smaller vehicle is unduly stressed.

Also, ABS systems on modern vehicles have a contamination problem when being towed. The ABS systems are rendered inoperative when their fluid level is altered by less than one ounce. Improper handling of these ABS brake systems can cause faults in their computer programs, and the operation of the brake and traction systems.

The prior art has sought to remedy this problem. In one such remedy, each time a vehicle is to be towed, a device is inserted into that vehicle to operate its braking system, or to substitute for its braking system. The device is then connected to the braking system of the towing vehicle through hydraulic, high pressure air, or vacuum lines. Though more effective than having no contribution to overall braking from the towed vehicle, these remedies rarely approach the ideal, in which no additional load is placed on the towing vehicle's brakes. Further, in order to independently operate the towed vehicle, the installed braking device must be removed, as well as the hydraulic, air or vacuum lines. The inconvenience of repeatedly installing and removing braking devices and cumbersome lines has limited the acceptance of these types of prior art systems. Additionally, the required connection and disconnection may result in air or other contamination of the closed brake systems, rendering them inoperative.

None of the prior art, taken either singly or in combination, is seen to describe the instant invention as claimed.

SUMMARY OF THE INVENTION

The present invention provides a new braking system for a first vehicle towing a second vehicle on its own four wheels. This is accomplished without cumbersome hydraulic, pneumatic, and/or vacuum lines connecting the braking apparatus of the first vehicle to that of the second vehicle. The invention operates independent of existing hydraulic or air brake systems using only electrical impulses from the brake system of the towing vehicle to activate a controller in that same vehicle which then activates the electronic actuator in the second vehicle (Towed Vehicle) which transfers its electronic energy to mechanical energy activating the hydraulic power brake system of the Towed Vehicle. The retrofitting of either brake system will not render either system inoperative. Further, the present invention provides modifications to the second vehicle's existing braking system which need not be removed, as the modifications do not interfere with normal independent operation of the second vehicle.

The braking system includes the existing braking apparatus on the first vehicle and the existing braking apparatus of the second vehicle with modifications as noted. These modifications include an electrically powered vacuum pump assembly for providing vacuum to an existing vacuum booster of the second vehicle; a one way check valve installed between the existing vacuum booster and engine of the second vehicle; an electrically powered brake actuator assembly installed in the second vehicle; and a mechanical actuator cable connecting the brake actuator assembly to the second vehicle's brake pedal.

Electrical power to the vacuum pump assembly and the battery of the second vehicle is provided through a first power line. Variable power to the actuator assembly is provided through the second power line. The first power line is connected to a power source in the first vehicle which will provide constant power from its battery and alternator when in operation. The second power line is connected to an adjustable controller in the first vehicle which operates electrically by sensing the brake lights have been activated by application of its brake light switch. The first and second power lines as well as the brake actuator line run through an umbilical between the first and second vehicles. The umbilical may be provided with socket and plug connectors at either, both, or anywhere along the umbilical, for connecting/disconnecting electrical power and communication between the first and second vehicle.

The electronic brake control located in the first vehicle is inertia activated utilizing integrated circuitry for safe, smooth stops. It has an ergonomic design which allows contour installation on the dash for maximum visibility and comfortable reach. It features an easy to access manual override slide lever, an LED power level display that shows the amount of current delivered to the second vehicle. Dual colored leveling system makes leveling easier, and a gain control adjusts the amount of current to the actuator. The present invention meets NHTSA regulations, and is compatible with virtually every 12 volt battery, or negative ground tow vehicle of foreign or domestic origin.

The first vehicle and second vehicle are mechanically connected by any convenient method, such as by a standard hitch assembly. So long as the mechanical connection is secure, the umbilical will be substantially safe from accidental disconnection. To provide braking in the second vehicle in the unlikely event that accidental disconnection in the umbilical does occur, an emergency brake circuit may be provided in the second vehicle along with an activating lanyard.

The emergency brake circuit is connected to the second vehicle's battery which provides input to an emergency brake switch of the circuit. The brake switch has outputs to both the brake actuator assembly and the vacuum pump assembly of the second vehicle. One end of the lanyard is attached to the switch, while the other is attached to the chassis of the first vehicle. The switch, normally in the open position, is closed when pulled by the connected lanyard, as would occur if the second vehicle should break away from the first. Thus closed, the emergency brake circuit would provide power from the second vehicle's battery to the brake actuator assembly and the vacuum pump assembly, and the second vehicle would brake.

Accordingly, the present invention provides an improved braking system that optimally and adjustably utilizes the braking apparatus of both a towing first vehicle and a towed second vehicle. The present invention also provides the operator of the towing vehicle the ability to adjust during driving, the brake required on the second vehicle, based on road conditions, traffic, weather, terrain, or any other variable the operator may encounter while traveling. Additionally, the present invention provides a kit for retrofitting existing braking apparatus of a first vehicle and a second vehicle to produce the improved braking system.

The present invention provides a system that does not require removal of any installed device within either the first or second vehicle to operate the vehicles independently. The present invention also provides emergency braking in the second vehicle should it accidentally break away from first vehicle. The present invention additionally provides improved elements and arrangements thereof in an apparatus for the purposes described which is inexpensive, dependable and fully effective in accomplishing its intended purposes.

The present invention provides an improved auxiliary brake system independent of variables in either the first vehicle, or second vehicles brake systems. Also, the present invention provides an improved brake system for vehicles pulling other vehicles on all four wheels, that is relative to pressure and not variable travel of brake pedals.

The present invention eliminates all variables of brake performance in towing situations by sensing the actual braking forces of the first vehicle and reproducing the same braking force in the second vehicle. Also, the present invention provides an improved auxiliary brake system that utilizes the power brakes of the second vehicle. Additionally, the present invention provides an improved auxiliary brake system which does not invade the existing brake systems of the first or second vehicles as not to affect the normal operation of their ABS systems.

The present invention provides a system that is hidden with all components located under the seat, under the dash, under the carpets or in the engine compartment as not to be visible. Also, the present invention provid an auxiliary braking system that is not vehicle manufacturer dependant, or dependant on a particular type of braking system (i.e. ABS). The present invention additionally provides an improved brake system for a first vehicle that tows a second vehicle that utilizes components available to the Recreational vehicle industry.

The present invention provides an improved auxiliary brake system which provides a variable braking force on the second vehicle that is relative to the braking utilized by the first vehicle. Also the present invention does not require frequent adjustments for proper operation. Additionally the present invention provides a manual override to apply the brakes in the second vehicle without applying the brakes in the first vehicle.

The present invention provides a visual indication to the operator of the first vehicle the amount of braking force used in both vehicles. Also the present invention provides a visual indication as to the continuity of the system and its operation.

These and other objects of the present invention will become readily apparent upon further review of the following specification and drawings.

BRIEF DESCRIPTION OF THE DRAWINGS

Like reference characters designate the same or similar parts throughout the drawings.

DETAILED DESCRIPTION OF THE PREFERRED EMBODIMENTS

Figure 1:
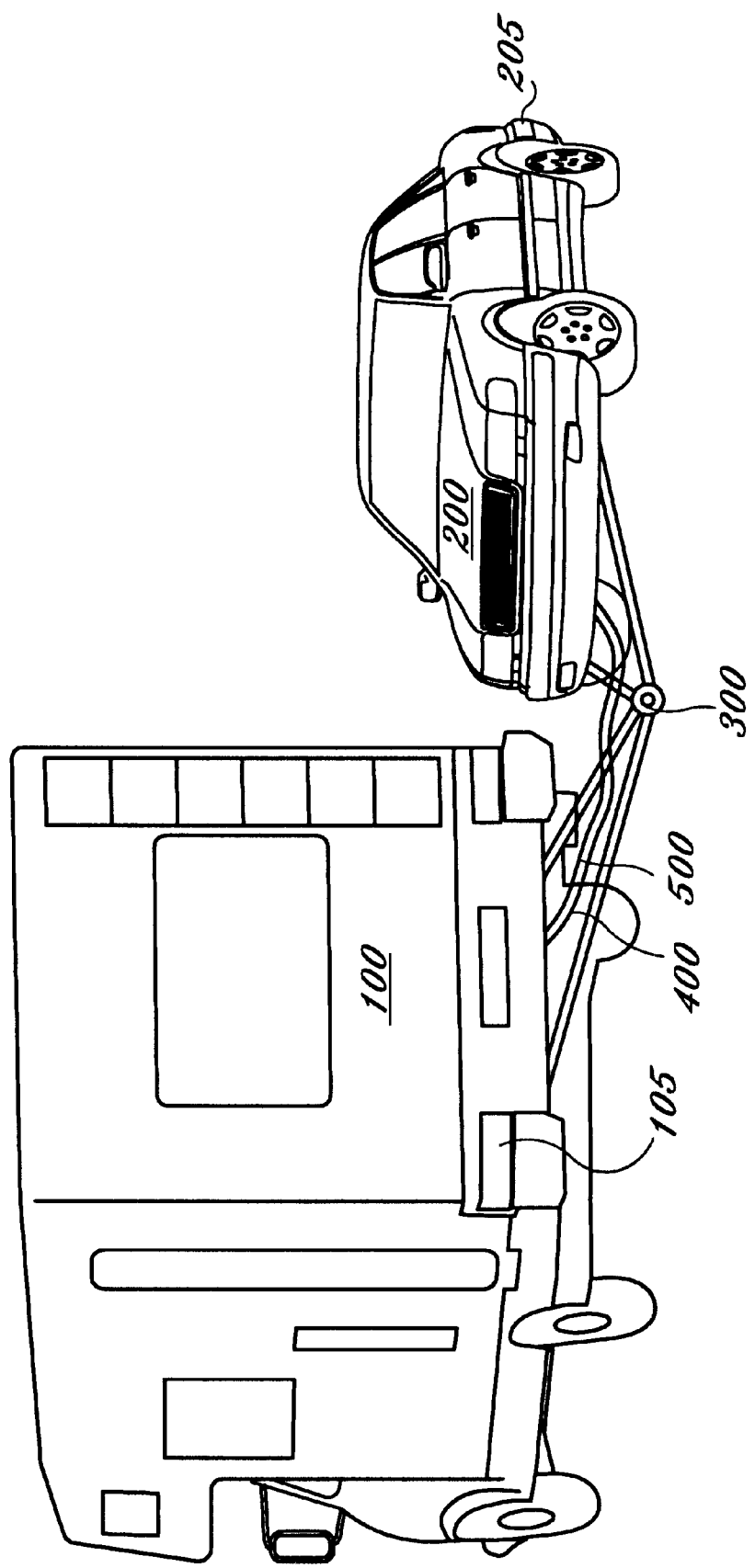
FIG. 1 is a perspective view showing a first vehicle towing a second vehicle with the present braking system in place. This view is not relative to operation. Only the controller located in the towing vehicle will be required to be leveled. The units retrofitting the second vehicle can be located upside down or side ways without effecting operation.

Referring to FIG. 1, the present invention provides a braking system 110, for a first vehicle 100, towing a second vehicle 200 on its own four wheels. A mechanical connection, hitch 300, removably and securely connects the first 100 and second 200 vehicles. An electrical umbilical connection 400, removably places the first 100 and second 200 vehicles in electrical communication, and includes a plurality of wires. By operating brakes 190 on the first vehicle, an electrical signal is sent to the first vehicle's brake lights 105. Substantially simultaneously, an electrical signal is sent from the first vehicle through the umbilical 400 to the second vehicle, activating the second vehicle's brakes and braking lights 205. A safety lanyard 500, connects the chassis of the first vehicle 100 to an emergency brake switch 222 of the second vehicle 200. No cumbersome hydraulic, pneumatic, or vacuum lines are required.

Figure 2:
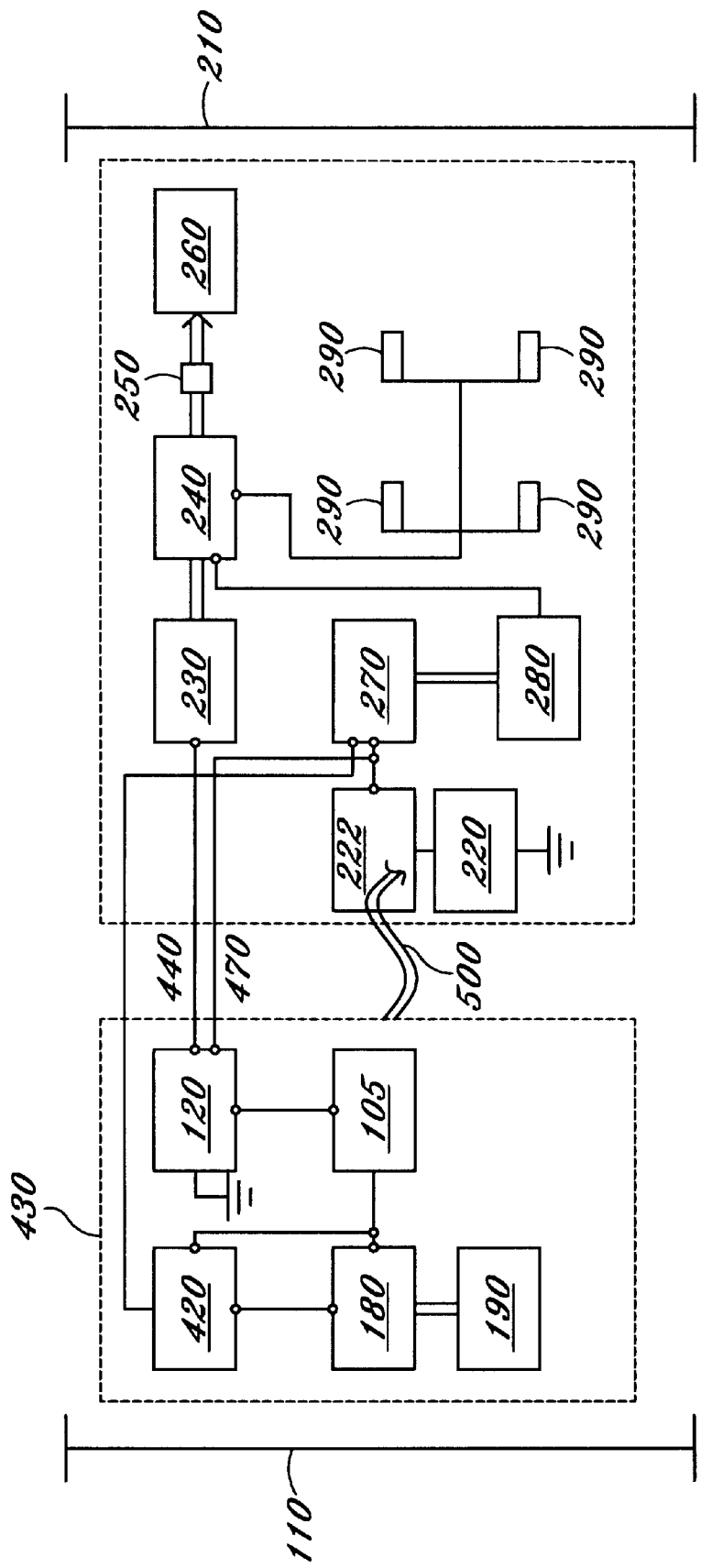
FIG. 2 is a block diagram of a braking system according to the present invention.

Referring to FIG. 2, the present braking system includes the existing mechanicavhydraulic braking apparatus of the first vehicle 110 and the existing mechanicavhydraulic apparatus of the second vehicle 210. The present braking system has not modified either existing brake system. Modifications to vehicle 200 are to tee into the vacuum line from the engine 260 to the brake booster 240 also to insert a one way valve 250 between the tee and the engine 260. Additional one way valve 250 is installed on the added vacuum line of vacuum pump 230. This one way valve 250 allows the vacuum pump assembly 230 to supply vacuum only to the brake booster 240 when the engine 260 is not running. When the engine 260 is running in normal operation mode, the engine 260 will supply the vacuum. In FIG. 2, dotted lines indicate mechanical connections to blocks, single solid lines indicate electrical connections between blocks, and double solid lines indicate vacuum connections between blocks. An electrically powered brake actuator assembly 270 is shown; and a mechanical brake actuator cable 272 connects the brake actuator assembly 270 to the second vehicle's brake pedal 280, for activating the second vehicles brakes 290.

Electrical power to the vacuum pump assembly 230 is provided through a first power line 440. Power to the brake actuator assembly 270 is provided through a second power line 470. These power lines are connected to the electric powersource in the first vehicle 100, battery 120. An emergency brake switch 222, normally open, is connected on the input end to the second vehicle's battery 220. The brake switch 222 is connected electrically to both the brake actuator assembly 270 and the vacuum pump assembly 230. Lanyard 500 is mechanically attached to the switch 222.

An adjustable br controller 420 receives its signal input from the brake light circuit 105 of the first vehicle 100. This controller 420 can provide variable current to the actuator assembly 270. A conventional feature controller 420 available in the recreational vehicle industry, may be advantageously used. This controller 420 produces a variable current relayed through the second power line 470 to the actuator assembly 270 when the brake lights 105 of the vehicle 100 are activated. This current is proportional to the amount of deceleration detected by the controller 420.

Figure 3:
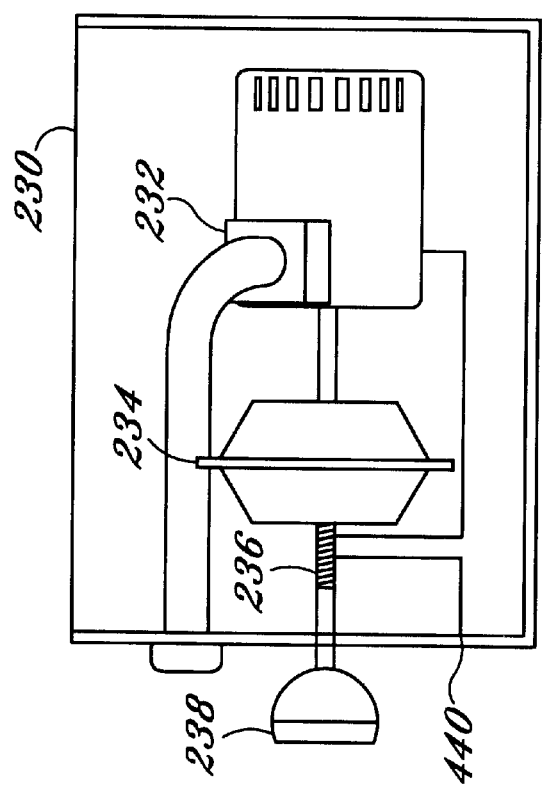
FIG. 3 is a detail cutaway top view showing a vacuum pump assembly according to a preferred embodiment of the present invention.

Referring to FIG. 3, the vacuum pump assembly 230 preferably includes a vacuum pump 232; a vacuum diaphragm choke dash pot 234; a vacuum adjustment spring 236 and a vacuum adjustment knob 238. By this arrangement, vacuum produced by the assembly 230 may be adjusted to produce 0 to 25 inches of vacuum. This is subsequently adjusted to an operating range of about 15 to about 20 inches of vacuum to the vacuum booster 240. A compressor of conventional design may be modified to provide the vacuum pump assembly 230.

Figure 4:
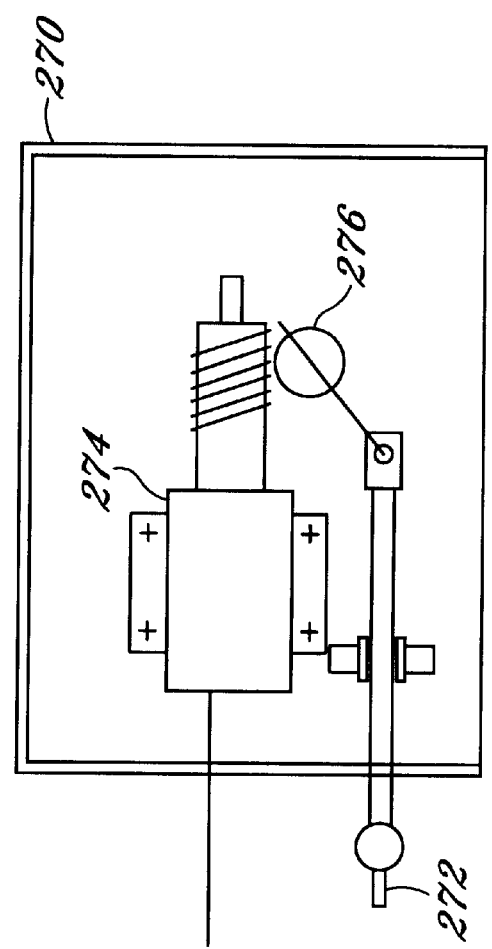
FIG. 4 is a detail cutaway side view of a brake actuator according to a preferred embodiment of the present invention.

Referring to FIG. 4, the brake actuator assembly 270 preferably includes a mounted solenoid 274 connected to one end of a pull lever 276 with the other end furthest from the pivot point to the brake actuator cable 272. The travel is then multiplied by the lever 276 so that one inch of travel of the solenoid 274 will relate to four inches of travel of brake actuator cable 272. Moving the brake actuator cable 272 closer or further from the pivot point will decrease or increase the travel to eliminate the variables in the towed vehicle's 200 brake pedal travel.

Figure 5:
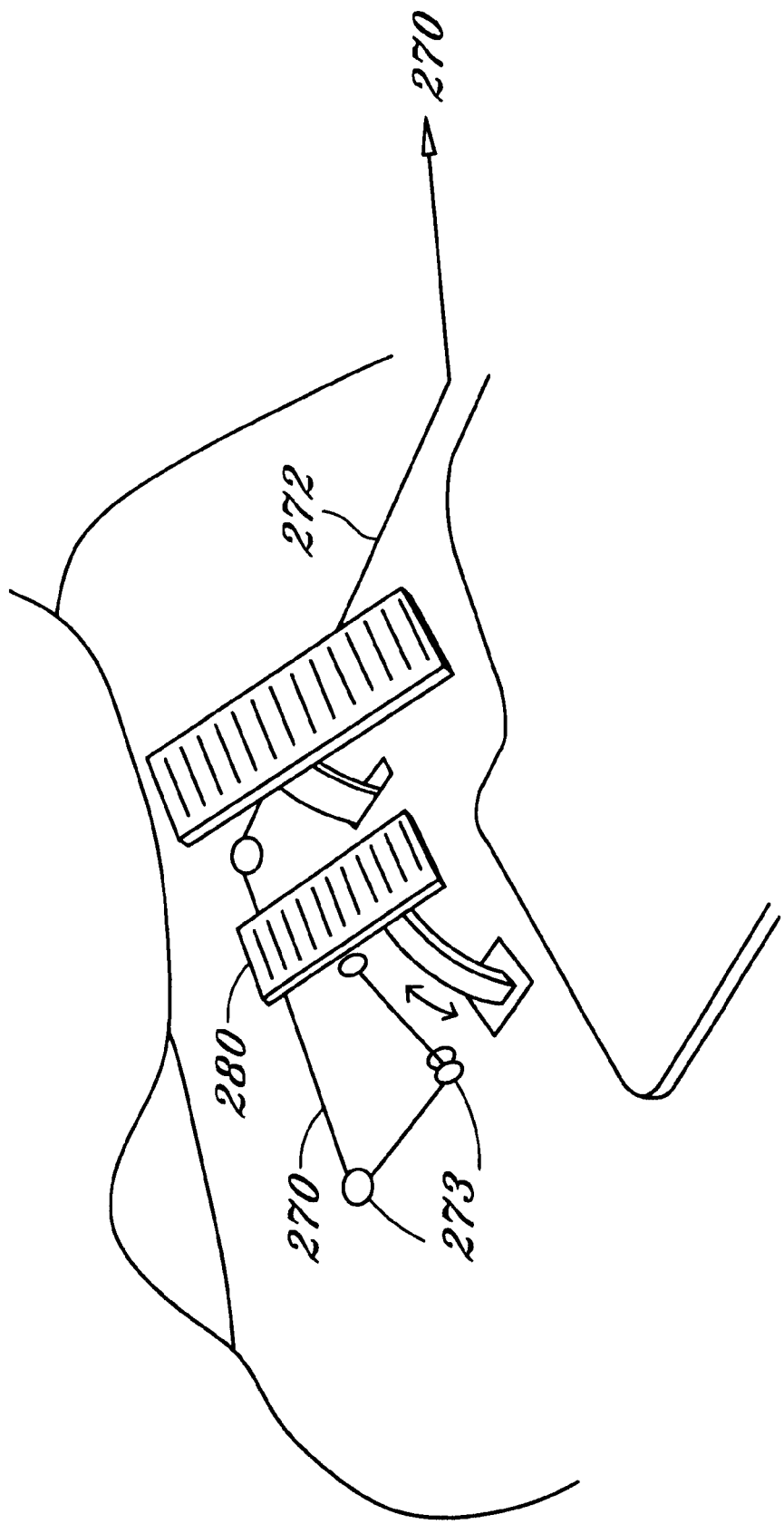
FIG. 5 is a side view of a brake pedal of the second vehicle, showing connections to a brake actuator cable.

Turning to FIG. 5 the actuator cable 272 runs from the actuator assembly 270 to the back of brake pedal 280 of the second vehicle 200, where it is securely attached. A preferred arrangement includes guides 273 through which cable 272 may slidably travel. These guides 273 may be secured to various interior surfaces of the second vehicle 200 to prevent lateral displacement of actuator cable 272, and allows more flexibility in the placement of actuator assembly 270.

Figure 6:
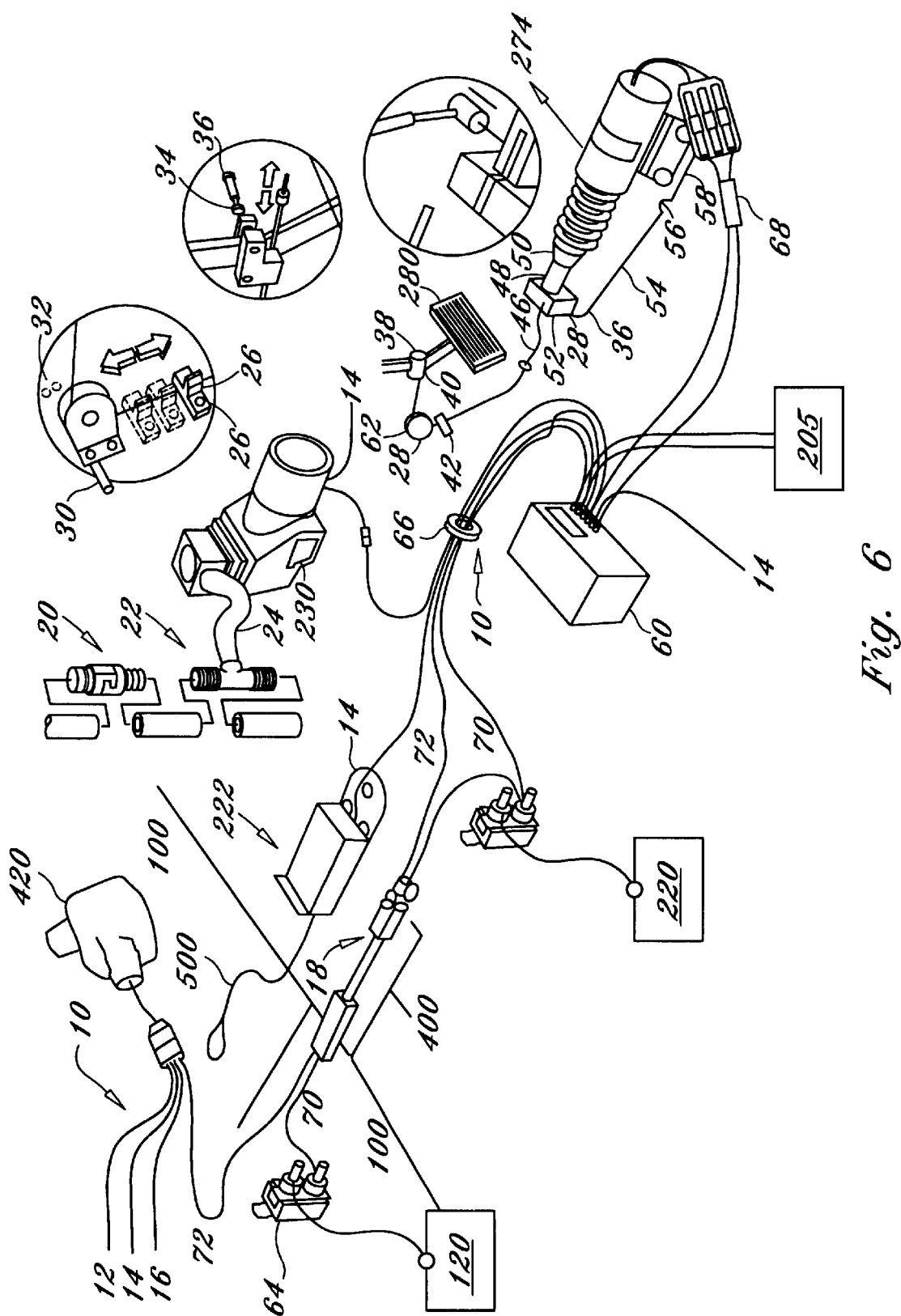
FIG. 6 shows the entire wiring and set up system for both vehicles, as well as how each component attaches to the next as fully assembled.

Referring to FIG. 6, a complete view of the present unified brake system of towed and towing vehicles is shown. This figure shows all electrical, mechanical and physical components of the present unified brake system for both vehicles 100 and 200. All components to the upper left are located on vehicle 100; all components at lower right are located in towed vehicle 200. Umbilical 400 connects between vehicle 100 and 200 electrically and contains power relay wires 440 and 470 as defined in FIG. 2. Lanyard 500 mechanically connects chassis 100 to chassis 200 at its break-away switch 222. Should the two vehicles become separated, the lanyard will pull out of break-away switch which is normally in the open position and supply operating power from vehicle 200 battery 220 to the vacuum pump 30 and the brake actuator assembly 270 by pulling cable 272 and subsequently pulling down on the brake pedal 280 applying power assisted brakes. Umbilical line 440 supplies charge and operating current to both the vacuum pump 230, brake actuator assembly 270, and battery 220 of vehicle 200 from vehicle 100 alternator and battery 120. A 20 amp circuit breaker 64 is in harness 10 for protection of wiring harness 10. In vehicle 100, wire 70, wire harness 10, wire 12, and wire 14 supply operating power from the battery of 120 of vehicle 100 when the key is turned on. Wire 16 is connected to the brake light switch for a signal when the brake lights are activated. Wire 72 contains operating signal and current for wire 470 of umbilical 400 to continue to brake actuator assembly 270. The brake actuator assembly 270 is mechanically connected through cable 272 which contains a sleeve and inner cable 272. The cable 272 runs under the carpet to its outer sleeve bracket 42 which securely attaches the sleeve to the floor of vehicle 200. The inner cable continues through guide 273 which is also secured to the floor directly behind the brake pedal 280. This inner cable continues on and is securely attached to the pedal 280.

The multiplication of travel as described in FIG. 4 is done by moving the point of attachment to pedal 280 closer or further away from its pivot point. Moving the attachment of cable 272 closer or further from the brake pedal 280 pivot point will compensate for variables in brake pedal 280 travel from rest to applied position and keep the solenoid operation in its limited one and one half inch of travel. Varying the current on solenoid 274, based on deceleration of inertia sensing controller 420 of vehicle 100, will reproduce the simultaneous same braking on vehicle 200 non relative to brake pedal travel. Maintaining the vacuum on booster 240 at the optimum level of between 10 to 25 inches of vacuum with vacuum pump assembly 230 when vehicle 200 is in tow will allow power assisted braking. A one way valve 250 is located between the tee and the engine in order to prevent vacuum pump 230 from supplying vacuum to the engine. Another one-way valve is internal to the vacuum pump 232; also a one-way valve 250 is located at the booster end of the line from the engine 260 at booster 240. A 40 amp circuit breaker 68 provides protection for wire harness 10 and its components located in vehicle 200. Power module 60 contains power amplification from controller 420 along with other associated relays and controls to control the operation of components located in vehicle 200, including break-away power brake actuator assembly 270. Brake actuator assembly 270 has a mounting plate, a solenoid 274, and associated hardware for mounting the outside sleeve of cable 272 at the plate. The inside cable is securely fastened to the solenoid core. The mounting hardware also serves as a stop for the core keeping it within its limited travel.

The umbilical electrical connection 400 is linked through circuit breaker 64, which protects the umbilical electrical connection 400 to the first vehicle 100. The umbilical electrical connection 400 then continues through that box to the battery 120 of the first vehicle 100. Attached to the umbilical electrical connection 400 is the wiring harness connector clamp 18 leading to the wiring harness 10 and the second vehicle 200. Adjacent to the umbilical electrical cord 400 is the safety lanyard 500 attached to the emergency brake switch 222. The emergency brake switch 222 is connected to the wiring harness 10. The wiring continues through a conventional fire wall 66 to the power module 60.

The power module 60 is connected to ground wire 14, the second vehicle's brake light switch 205, and through a connector 68 to the electronic solenoid 274. The electronic solenoid 274 sits on the solenoid plate 54, and ends at the solenoid stop 52. The solenoid 274 is held together by means of an Allen set screw 28, a socket head screw cap 36, a lock nut 58, a carriage bolt 56, and a jam nut 50. The electronic solenoid 274 is attached by cable assembly 46 to an outer cable stop bracket 42, and through the bracket 42 around self tapping screw 26 to the flat block pulley 62. From the self tapping screw 26, the cable assembly 46 continues through the brake pedal bracket clamp 38 to the brake pedal adjust side 40 intersecting the brake pedal 280. Shown in the enlarged detail sections of the drawing we see a close up view of the self tapping screw 26, Allen set screw 28, hairpin clip 30, and pulley pin 32, as attached to the cable assembly 46. When the solenoid 274 is signaled by the power control module 60 it will pull on cable assembly 46 thus depressing the brake pedal 280. The amount of current relayed from the power control module 60 to the solenoid 274 determines the amount of pull sent to the cable assembly 46, and the amount of pressure of the brake pedal 280.

Also shown in enlarged detail are the lock washer 34 and socket head cap screw as attached to the electronic solenoid 274. The power module 60 is simultaneously attached via a wire harness 10 through the fire wall 66 to the vacuum pump assembly 230. The vacuum pump assembly 230 is attached via hose 24 to tee fittings 22 which in turn are connected to conventional check valves 20.

It is to be understood that the present invention is not limited to the embodiments described above, but encompasses any and all embodiments within the scope of the following claims.

I claim:

1. A braking system for a first vehicle towing a second vehicle such that said second vehicle remains on its own four wheels, said system comprising:

a first vehicle braking apparatus including a first brake pedal, an electrical first brake circuit operatively responsive to activation of said first brake pedal, and first brakes for braking said first vehicle also responsive to activation of said first brake pedal;

a second vehicle braking apparatus including a second brake pedal, and second brakes for braking said second vehicle responsive to activation of said second brake pedal, said second brakes operable when provided sufficient vacuum;

a brake controller provided in said first vehicle electrically connected to said electrical first brake circuit, said controller producing a brake actuator signal when first brake pedal is activated;

an electrically powered brake actuator assembly provided in said second vehicle mechanically connected to said second brake pedal and electrically connected to said brake controller in said first vehicle, said actuator assembly responsive to said brake actuator signal as input to provide mechanical actuation of said second brake pedal of said second vehicle;

an electrically powered vacuum pump assembly provided in said second vehicle for continuously providing sufficient vacuum to said second brakes, said electrically powered vacuum pump assembly providing sufficient vacuum to said second brakes instantaneously as soon as said electrically powered brake actuator assembly receives said brake actuator signal;

an umbilical electrically connecting said first vehicle to said second vehicle, said umbilical including a brake actuator assembly power line, a vacuum pump assembly power line, and a brake actuator signal line;

a means for determining and applying an amount of pressure of said second brakes independent of an amount of pressure of said first brakes, wherein said amount of pressure on said second brakes provides equal stopping force as said first brakes, and a hitch mechanically connecting said first vehicle to said second vehicle;

wherein said electrically powered vacuum pump assembly operates instantaneously and with separate vacuum from said first vehicle; and providing a stopping force to enable substantially equal spacing between said first vehicle and said second vehicle during braking.

2. A braking system according to claim 1, wherein said second vehicle braking apparatus includes a second brake circuit electrically connected to said electrically powered brake actuator assembly and said vacuum pump assembly; a second power source in said second brake circuit; an emergency brake switch, normally open, provided in said second brake circuit; a safety lanyard connected to said emergency brake switch on one end, and to said first vehicle on another end, such that tension on said lanyard is translated to said emergency brake switch, closing said second brake circuit, thereby providing electrical power from said second power source to said electrically powered brake actuator assembly and said vacuum pump assembly in the event that said second vehicle should become disconnected from said first vehicle.

3. A braking system according to claim 1, wherein said second braking apparatus includes a vacuum booster, and at least one check valve is provided in said second braking apparatus upstream said vacuum booster.

4. A braking system according to claim 1, wherein said umbilical is provided with at least one connector for reversibly connecting said first vehicle and said second vehicle electrically.

5. A braking system according to claim 1, wherein said brake controller is adjustable to provide a brake actuator signal of variable current to said brake actuator assembly; and said brake actuator assembly responds to said variable current by providing variable force on said second brake pedal.

6. A braking system according to claim 1, wherein said vacuum pump assembly includes a vacuum pump, a vacuum choke dash pot connected to said vacuum pump, a vacuum adjustment spring attached to said vacuum choke dash pot, and a vacuum adjustment knob attached to said vacuum adjustment spring, whereby vacuum provided by said vacuum pump assembly is adjustable by turning said vacuum adjustment knob.

7. A braking system according to claim 6, wherein said vacuum pump assembly is adjustable to provide up to 25 inches of vacuum.

8. A braking-system according to claim 1, wherein said second brake pedal includes a foot surface and an undersurface opposite said foot surface; and said brake actuator assembly is connected through a brake actuator cable mounted to said undersurface of said second brake pedal to pull said second brake pedal.

9. A braking system according to claim 8, wherein said brake actuator assembly includes a solenoid responsive to the brake actuator signal, gearing mechanically connected to said solenoid to multiply movement of said solenoid, and a pull lever attached to said gearing and to said brake actuator cable for translating multiplied movement of said solenoid to pulling force on said brake actuator cable.

10. A braking system according to claim 9, wherein said solenoid produces from about 10 to about 90 pounds of pressure over a one inch travel; and said gearing multiplies the movement of said solenoid to provide about a four inch travel where said pull lever is attached to said actuator cable.

11. A braking system according to claim 8, wherein at least one guide secured to at least one surface of said second vehicle and said actuator cable is slidably received in said guide.

12. A kit providing a braking system for a first vehicle towing a second vehicle, said first vehicle having a pre-existing first braking apparatus including a first brake pedal, an electrical first brake circuit operatively responsive to activation of said first brake pedal, and first brakes for braking said first vehicle also responsive to activation of said first brake pedal; said second vehicle having a pre-existing braking apparatus including a second brake pedal, and second brakes for braking said second vehicle responsive to activation of said second brake pedal, said second brakes operable when provided sufficient vacuum; said kit including:

- a brake controlled for installation in said first vehicle to be electrically connected to said electrical first brake circuit, said controller once installed producing a brake actuator signal when said first brake pedal is activated;
- an electrically powered brake actuator assembly for installation in said second vehicle to be mechanically connected to said second brake pedal and electrically connected to said brake controller in said first vehicle, said actuator assembly responsive to said brake actuator signal as input to provide mechanical actuation of said second brake pedal of said second vehicle once installed;
- an electrically powered vacuum pump assembly for installation in said second vehicle for continuously providing sufficient vacuum to said second brakes;
- an umbilical for electrically connecting said first vehicle to said second vehicle, said umbilical including a brake actuator power line, a vacuum pump assembly power line, and a brake actuator signal line; and
- a means for determining and applying an amount of pressure of said second brakes independent of an amount of pressure of said first brakes, wherein said amount of pressure on said second brakes provides a stopping force to enable substantially equal spacing between said first vehicle and said second vehicle during braking.

* * * * *